(12) United States Patent
Westhoff et al.

(10) Patent No.: US 11,162,618 B2
(45) Date of Patent: Nov. 2, 2021

(54) FLEXIBLE ARMOURED PIPE WITH A RETAINING LAYER OF METAL ELONGATE STRIP

(71) Applicant: National Oilwell Varco Denmark I/S, Brondby (DK)

(72) Inventors: Karl-Johan Lolk Westhoff, Holte (DK); Jon Moller Andersen, Gorlev (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 163 days.

(21) Appl. No.: 16/315,247

(22) PCT Filed: Jul. 5, 2017

(86) PCT No.: PCT/DK2017/050226
§ 371 (c)(1),
(2) Date: Jan. 4, 2019

(87) PCT Pub. No.: WO2018/006919
PCT Pub. Date: Jan. 11, 2018

(65) Prior Publication Data
US 2019/0162334 A1 May 30, 2019

(30) Foreign Application Priority Data
Jul. 6, 2016 (DK) .......................... PA 2016 70504

(51) Int. Cl.
*F16L 11/08* (2006.01)
*F16L 11/16* (2006.01)
*E21B 17/20* (2006.01)

(52) U.S. Cl.
CPC ............. *F16L 11/083* (2013.01); *E21B 17/20* (2013.01); *F16L 11/16* (2013.01)

(58) Field of Classification Search
CPC ......... E21B 17/20; F16L 11/083; F16L 11/14; F16L 11/16; F16L 11/24
(Continued)

(56) References Cited

U.S. PATENT DOCUMENTS 940,779 A * 11/1909 Bayne ................... F16L 11/083
138/130
1,831,724 A * 11/1931 Stokes ................. B29D 23/001
138/130
(Continued)

FOREIGN PATENT DOCUMENTS

DE 1650142 A1 9/1970
EP 1729048 A1 12/2006
(Continued)

OTHER PUBLICATIONS

Extended European Search Report for corresponding application EP-17823699.8, dated Oct. 31, 2019.
(Continued)

*Primary Examiner* — Kenneth Rinehart
*Assistant Examiner* — Richard K. Durden
(74) *Attorney, Agent, or Firm* — Peame & Gordon LLP

(57) ABSTRACT

The present invention relates to a flexible armoured pipe having a centre axis and including an internal pressure sheath and an outer sheath, where the radial distance between the internal pressure sheath and the outer sheath defines an annulus. The annulus includes at least one tensile armour layer surrounded by at least one retaining layer constituted by an elongate metallic strip wound around the at least one tensile armour with a winding angle of at least 65° in respect of the centre axis.

18 Claims, 6 Drawing Sheets

(58) Field of Classification Search
USPC .................................... 138/130, 134, 135
See application file for complete search history.

(56) References Cited

U.S. PATENT DOCUMENTS

| | | | | |
|---|---|---|---|---|
| 3,603,517 | A * | 9/1971 | McDonald | F16L 11/24 242/444 |
| 4,403,631 | A * | 9/1983 | Abdullaev | F16L 11/16 138/130 |
| 4,431,034 | A * | 2/1984 | Abdullaev | B29C 70/207 138/130 |
| 4,867,205 | A | 9/1989 | Bournazel | |
| 5,024,252 | A | 6/1991 | Ochsner | |
| 5,176,179 | A * | 1/1993 | Bournazel | F16L 11/083 138/130 |
| 5,499,661 | A * | 3/1996 | Odru | F16L 11/083 138/124 |
| 6,065,501 | A | 5/2000 | Feret et al. | |
| 6,338,365 | B1 | 1/2002 | Odru | |
| 6,363,974 | B1 | 4/2002 | Perez et al. | |
| 6,446,672 | B1 | 9/2002 | Kalman et al. | |
| 7,055,551 | B2 | 6/2006 | Fraser et al. | |
| 7,328,725 | B2 * | 2/2008 | Henry | F16L 11/082 138/124 |
| 2002/0144745 | A1 | 10/2002 | Fraser et al. | |
| 2003/0056845 | A1 | 3/2003 | Fraser et al. | |
| 2004/0025953 | A1 | 2/2004 | Fraser et al. | |
| 2008/0283138 | A1 * | 11/2008 | Rytter | F16L 11/16 138/133 |
| 2009/0050228 | A1 * | 2/2009 | Coutarel | F16L 11/081 138/131 |
| 2009/0236004 | A1 * | 9/2009 | Jani | F16L 11/083 138/127 |
| 2012/0266997 | A1 | 10/2012 | Thygesen et al. | |
| 2013/0014849 | A1 * | 1/2013 | Glejbol | F16L 11/083 138/137 |

FOREIGN PATENT DOCUMENTS

| | | | | |
|---|---|---|---|---|
| GB | 1431060 | A * | 4/1976 | ........... F16L 11/088 |
| WO | 00/36324 | A1 | 6/2000 | |
| WO | 2006/005689 | A1 | 1/2006 | |
| WO | 2015/082865 | A1 | 6/2015 | |

OTHER PUBLICATIONS

"Recommended Practice for Flexible Pipe", ANSI/API 17 B, fourth Edition, Jul. 2008.
"Specification for Unbonded Flexible Pipe", ANSI/API 17J, Third edition, Jul. 2008.
Danish Search Report for Application No. PA 2016 70504, dated Jan. 18, 2017.
International Search Report for International Application No. PCT/DK2017/050226, dated Aug. 23, 2017.

* cited by examiner

FLEXIBLE ARMOURED PIPE WITH A RETAINING LAYER OF METAL ELONGATE STRIP

TECHNICAL FIELD

The present invention relates to flexible pipes for marine applications such as the transport of oil or gas or other fluids in a sub-sea environment.

Such flexible pipes are usually constructed of a number of independent layers, such as helically laid steel and polymeric layers formed around a central bore for transporting fluids. A typical flexible pipe comprises from the inside and outwards an inner armoring layer known as the carcass, an internal pressure sheath surrounded by one or more armoring layers, such as pressure armoring and tensile armoring, and an outer sheath. Thus, the internal pressure sheath forms a bore in which the fluid to be transported is conveyed. In some unbonded flexible pipes the carcass may be omitted. When the carcass is omitted the bore is denoted a smooth bore. When the carcass is present the bore is denoted a rough bore. The annular space between the internal pressure sheath and the outer sheath is known as the annulus and houses the pressure armoring and sometimes the tensile armoring. Depending on the specific use of the pipe the annulus may sometimes only comprise a pressure armour or only a tensile armour.

The flexible pipes may carry the fluids between a hydrocarbon reservoir located under the sea bed and a floating structure. The fluid may be a hydrocarbon fluid, such as natural gas or oil, depending upon the nature of the hydrocarbon reservoir, or an injection fluid such as water. The fluids, which are transported to the floating structure, are processed, for example by compression and/or further treatment. When the floating structure is moored close to a gas field or hydrocarbon reservoir, it can be kept in fluid communication with the producing well heads via one or more flexible pipes. The one or more flexible pipes convey(s) fluids between the well heads of a hydrocarbon reservoir and the floating structure. Flexible pipes may be configured as free-hanging catenaries or provided in alternative configurations, such as lazy wave and lazy S types, using buoyancy modules. Thus, a flexible pipe may be connected at one end to the floating structure, and at another end to a pipe base manifold, by which the flexible pipe is secured to the sea bed.

Flexible pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. As mentioned such pipes usually comprise an innermost sealing sheath—often referred to as an internal pressure sheath or an inner liner, which forms a barrier against the outflow of the fluid which is conveyed in the bore of the pipe, and one or usually a plurality of armoring layers. Normally the pipe further comprises an outer protection layer, often referred to as the outer sheath, which provides mechanical protection of the armor layers. The outer protection layer may be a sealing layer sealing against ingress of sea water. In certain unbonded flexible pipes one or more intermediate sealing layers is/are arranged between armor layers.

In general flexible pipes are expected to have a lifetime of about 20 years in operation.

Thus, a flexible pipe comprises an internal pressure sheath forming a barrier against outflow of the fluid being transported in the pipe. The internal pressure sheath may typically be surrounded by one or more layers of one or more wound armouring profiles. The armouring layers may—depending on the application of the flexible pipe—e.g. be separated by one or more intermediate layers such as membranes. The intermediate layer or layers may be continuous and forming a barrier against outflow or inflow of fluids (like the internal pressure sheath) or wound and thereby open. The flexible pipe is typically surrounded by an outer sheath forming a protective barrier against the outer environment.

In one type of pipes, the armouring layers are made from wires which are not bonded to each other or adjacent layers, which ensures the flexibility of the pipe. This type of pipe is generally termed an unbonded flexible pipe.

The mentioned type of pipe is e.g. used for the transport of oil and gas at large or intermediate sea depths. The mentioned construction is particularly well suited for the transport of oil and gas from subsea sources to installations at sea level where the oil and gas are being treated or forwarded for further processing.

Often pipes of the above mentioned type comprise an internal pressure sheath surrounded by one or more armouring profiles, which are wound around the inner liner at a large angle, e.g. larger than 80°, relative to the centre axis of the pipe. This or these layer(s) primarily compensate(s) radial forces in the pipe structure and are here termed pressure armouring layers. The pressure armouring layers are surrounded by one or more armouring profiles, which are wound at a considerably smaller angle, e.g. between 10° and 50°, relative to the centre axis of the pipe. This or these layer(s) primarily compensates axial forces in the pipe and is/are termed tensile armouring layers. The armouring layers are typically made of steel. A pipe of this kind is in general surrounded by an outer layer forming a protective barrier against the outer environment. Such a pipe is e.g. described in WO 00/36324.

To avoid prohibitively large radial deformations of the tensile armouring layers due to torsion, axial compression and/or bending of the pipe, an outer armouring layer is sometimes wound at a large angle around the tensile armouring layer(s). This armouring layer is made of very flat profiles in the form of fibre reinforced polymeric tapes and often referred to as a retaining layer.

To reduce contact pressure between the tensile armouring layers and the surrounding armouring layer due to internal pressure, the surrounding armouring layer it is made from tapes with a precisely balanced strength to stiffness. An outer radial armouring layer made of such tapes fulfils the function of limiting the radial deformations in tensile armouring layers of the flexible pipe without considerably increasing the contact pressure on the underlying tensile armouring layers. Tapes of this type are e.g. disclosed in US-2004/0025953 and in WO 2006/005689.

To ensure that the tapes have a precisely balanced stiffness and sufficient strength to withstand the load on the tape, they are manufactured in several independent processes, where a given reinforcement material, e.g. polyaromatic (aramide) fibres in a certain number are assembled to cords, which subsequently are embedded in a carrier material, e.g. polyethylene, and formed to a tape of a specific width and thickness on a specific manufacturing tool. This solution is very inflexible with regard to constructional and manufacturing freedom for pipes which are constructed and manufactured for specific applications. It, thus, requires inappropriately many variants of these tapes to be able to cost-effectively manufacture flexible pipes with inner dimensions from 2" to 16" (app. 5.1 cm to app. 40.6 cm) in diameter, suited for internal pressure loads from 50 to 600 bars for use above or below sea level down to 2500 m's depth. Furthermore, these tapes are expensive to produce and prone to degeneration due to hydrolysis at elevated temperatures.

U.S. Pat. No. 6,065,501 A discloses a flexible pipe comprising two layers of pressure armour disposed on each side of two layers of tensile armour layers. The pressure armour is an interlocked T/U armour adapted for resisting internal and external pressure in radial direction of the pipe

DISCLOSURE OF INVENTION

An object of the present invention is to provide a flexible pipe which can be produced in an uncomplicated and cost-effective manner.

A further object is to provide an alternative solution to tapes constituting outer armouring layers in a flexible pipe.

The present invention provides a flexible pipe which can be produced at relative low cost, is resistant to hydrolysis, and still exhibits excellent properties in respect of strength and flexibility.

The present invention relates to a flexible armoured pipe having a centre axis and comprising an internal pressure sheath and an outer sheath, the radial distance between said internal pressure sheath and said outer sheath defining an annulus, said annulus comprises at least one tensile armouring layer surrounded by at least one retaining layer constituted by an elongate metallic strip wound around the at least one tensile armour with an winding angle of at least 65° in respect of the centre axis.

The flexible pipe comprises an internal pressure sheath which is substantially fluid tight. The internal pressure sheath is normally an extruded polymer, such as polyethylene, polyamide or polyvinylidene fluoride. The internal pressure sheath forms the bore in which the fluid to be transported is conducted. The inner surface of the internal pressure sheath may be supported by a carcass, which is a metallic armour layer placed in the bore and usually in contact with the fluid to be transported.

The outer sheath is normally the outermost layer of the pipe, which outer surface is in contact with the surrounding environment. In most flexibles pipes the outer sheath is substantially fluid tight to avoid that fluids from the environment, such as sea water, diffuse into the pipe and come into contact with the metallic armour layers, which may cause corrosion. The outer sheath is made from a substantially fluid tight polymer material which e.g. may be polyethylene, polyamide or polypropylene.

The flexible pipe comprises a longitudinal axis which also defines a centre axis of the pipe, and sometimes simply is referred to as the axis. In most embodiments the flexible pipe is substantially symmetrical around the centre axis.

The term "substantially" should herein be taken to mean that ordinary product variances and tolerances are comprised.

The term "radial distance" is used herein to mean the distance to the axis of the pipe determined perpendicularly to the axis when the pipe is substantially straight.

The term "in radial direction" means a direction from the axis of the pipe and radially outwards. The direction is substantially perpendicular to the axis.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

The retaining layer constituted by the elongate metallic strip serves to protect the pipe from damage caused by large unintentional radial dislocations of the tensile armour. This is what the name of the layer indicates, namely the ability to retain the tensile armour in position and avoid in particular radial displacement, i.e. displacement in radial direction, and deformation of the tensile armour. The retaining layer is capable of resisting internal pressure, however, the retaining layer is not capable or designed for resisting external pressure. In contrast to this, a pressure armour serve to protect the flexible pipe in respect of internal and external pressure.

The fact that it is possible to provide the retaining layer by means of a metal strip is unexpected as the general consensus is that metal strips are too rigid to be used as retaining layer and therefore would take up radial forces resulting from internal pressure in the pipe.

The elongate metallic strip may have a width/thickness ratio which may vary within a rather wide range, however in an embodiment the elongate metallic strip has a width/thickness ratio in the range of 2 to 300. The width/thickness ratio in the range 2 to 300 provides an elongate metallic strip which is easy to handle and mount on the flexible pipe while at the same time having sufficient strength.

Thus, in an embodiment the elongate metallic strip has a width in the range 20 mm to 150 mm and a thickness in the range 0.5 mm to 10 mm.

The thickness of the elongate metallic strip is the dimension or extension in substantially radial direction of the pipe when the elongate metallic strip is wound around the pipe. In a corresponding manner the width of the elongate metallic strip can be considered as the dimension or extension in substantially axial direction of the pipe when the elongate metallic strip is wound around the pipe.

In an embodiment, the elongate metallic strip has a thickness, which is up to ½, such as up to ⅓ of the thickness of the tensile armour or thinner. It is desired that the retaining layer formed by the metallic strip have as low weight as possible to reduce the weight of the pipe. Consequently, it has been found that because the retaining layer serves to resist internal pressure it does not require the dimensions and strength, which are required for the tensile armour. Therefore, the metallic strips may be thinner than the wires forming the tensile armour.

It has been found that it is advantageous to provide the retaining layer by using elongate metallic strips which has a bending stiffness which is lower than the bending stiffness of the tensile armour as the retaining layers serves to resist internal radial forces. Thus, in an embodiment the elongate metallic strip has a bending stiffness lower than ¹⁄₁₀ of the bending stiffness of the tensile armour.

The bending stiffness K is determined as the force p required to bend length sections of the wire forming the tensile armour and the elongate metallic strip to achieve a certain deflection w, measured at 20° C.

The bending stiffness K can be calculated by the equation $$K = p/w$$

The tensile armouring layer or layers in the flexible pipe which is/are surrounded by the elongate metallic strip forming the retaining layer is/are normally made from tensile armour strips wound with a winding angle in respect of the centre axis in the range of 10° to 50°. It has been found that it is advantageous to wind the metallic strips of the retaining layer with a shorter pitch, such as wound with a winding angle in respect of the centre axis in the range of 65° to 90°, or wound with a winding angle in respect of the centre axis in the range of 65° to 88,9°. In an embodiment the metallic strips of the retaining layer are wound with a winding angle in respect of the centre axis in the range of 70° to 85°.

The elongate metallic strip of the retaining layer may be wound with gaps between adjacent windings to provide a lighter flexible pipe. Thus, in an embodiment of the flexible pipe, the elongate metallic strip is wound with a gap between adjacent windings, said gap being in the range 1 mm to 350 mm, such as in the range 3 to 150 mm.

However, if higher strength of the retaining layer is required the elongate metallic strip may be wound with overlap between adjacent windings. In an embodiment the elongate metallic strip is wound with an overlap zone between adjacent windings, in which the overlap zone having a zone width in the range 1 mm to 100 mm. The zone width is substantially parallel to the centre axis of the pipe.

In an embodiment the elongate metallic strip of the retaining layer is provided with a surface which is rougher in the overlap zone than in the remaining surface. The rougher surface serves to improve the properties in respect of anti-slip and attachment. The rough surface may be produced in a variety of ways, e.g. by machining such as rolling, milling or cutting. The desired roughness may be obtained in various ways, either during the formation of the rough surface or by post processing of the surface, such as honing. For instance, the surface may be post processed with a textured roll, or by abrasive blasting. The surface in the overlap zone may be provided with a surface finish comprising a surface roughness Ra value about 0.2 µm or more. The Ra-value may be measured in accordance with the ISO 4287, DIN 4762 and/or DIN 4768 standards, with a roughness cut-off wavelength, $L_c$ of 2.5 mm.

In an embodiment of the flexible armoured pipe according to the invention, the retaining layer comprises of two or more elongate metal strips, the strips being wound in a parallel track with the same winding directions in respect of the centre axis. The two or more elongate metal strips may be identical or different, and the embodiment provides large freedom to design the flexible pipe.

In another embodiment of the flexible armoured pipe according to the invention, the retaining layer comprises at least two layers constituted by elongate metal strips, said strips being wound with different winding angles in respect of the centre axis. The embodiment above provides a flexible pipe having high strength in respect of avoiding deformation in radial direction.

The elongate metallic strip forming the retaining layer is made of steel, titanium, or another metal or alloy, such as e.g. stainless steel, or duplex steel. In an embodiment of the flexible armoured pipe the elongate metallic strip is made of an alloy in which the primary constituent is Fe.

For the purpose of ensuring that the flexible armoured pipe has sufficient strength the elongate metallic strip in an embodiment has a tensile strength of 250 MPa or more, such as 500 MPa or more when measured according to ASTM E8/E8M-13 (2013).

It is clear that elongate metallic strip for forming the retaining layer may also be provided with indentations, slits, notches and/or protrusions. These indentations, slits, notches and/or protrusions may serve to reduce the risk of undesired axial displacement between the retaining layer and the outer sheath.

Moreover, in an embodiment of the flexible armoured pipe according to the invention the elongate metallic strip has rounded edges. Rounded edges may serve to prevent damage on adjacent layers. The edges may be rounded to have a curvature corresponding to the curvature of a circle with radius between 5% and 50% of the strip thickness.

Although the elongate metallic strip may be provided with rounded edges as described above the invention provides an embodiment in which the elongate metallic strip has a substantially rectangular cross section. An elongate metallic strip having a substantially rectangular cross section is easy to wind around e.g. a tensile armour on a flexible pipe.

In an embodiment the elongate metallic strip has an undulated cross section. The undulated cross section may serve to improve attachment in embodiments where the elongate metallic strip is wound with overlapping sections. The undulated cross section may also serve to reduce displacement between the retaining layer and outer sheath and/or tensile armour.

The flexible armoured pipe comprises at least one tensile armour which is surrounded by the retaining layer. Preferably the tensile armour is wound from an elongate member with a winding angle in respect of the centre axis in the range of 10° to 50°.

The flexible armoured pipe may also comprise at least one pressure armour. The pressure armour is located in the annulus and surrounding the internal pressure sheath. In an embodiment the at least one pressure armour is wound from an elongate member with a winding angle in respect of the centre axis in the range of 75° to 90°.

A flexible armoured pipe wherein the elongate metallic strip forming the retaining layer has a bending stiffness lower than 1/10 of the bending stiffness of the pressure armour.

As the retaining layer should only resist internal pressure it is not required to be as stiff as the pressure. Moreover, a less stiff metallic strip is easier to wind around the pipe.

The bending stiffness K is determined as the force p required to bend length sections of the wire forming the pressure armour and the elongate metallic strip to achieve a certain deflection w, measured at 20° C.

The bending stiffness K can be calculated by the equation:

$$K=p/w$$

The present invention also relates to use of an elongate metallic strip for forming a retaining layer in a flexible pipe, where the elongate metallic strip has a substantially non-profiled cross section.

The elongate metallic strip wound around at least one tensile armour with a winding angle of at least 65° with respect to the centre axis of the pipe. The wound elongate metallic strip forms a retaining layer around the tensile armour which is the outermost tensile armour of the pipe in case the pipe comprises more than one tensile armour layer.

The phrase "substantially non-profiled cross section" in this context means that the elongate metallic strip has a rectangular cross section, i.e. the elongate metallic strip is "flat". However, the phrase also allows for the cross section of the elongate metallic strip to be slightly curved or undulated. However, the elongate metallic strip does have a cross section, which will allow the metallic strip not to interlock when wound around the pipe.

The elongate metallic strip is wound around the tensile armour with a winding angle in the range of 65° to 90°. Two metallic strips may be used. If two metallic strips are used, they may be wound in parallel and form one or two retaining layer(s). Two metallic strips may also be wound as cross-wound strips in opposite directions in respect of the centre axis of the pipe and form two retaining layers in the pipe.

DETAILED DESCRIPTION OF THE INVENTION

The invention will now be described in further details with reference to embodiments shown in the drawing in which.

The figures are not accurate in every detail but only sketches intended to the show the principles of the invention. Details which are not a part of the invention may have been omitted. In the figures the same reference numbers are used for the same parts.

Figure 1:
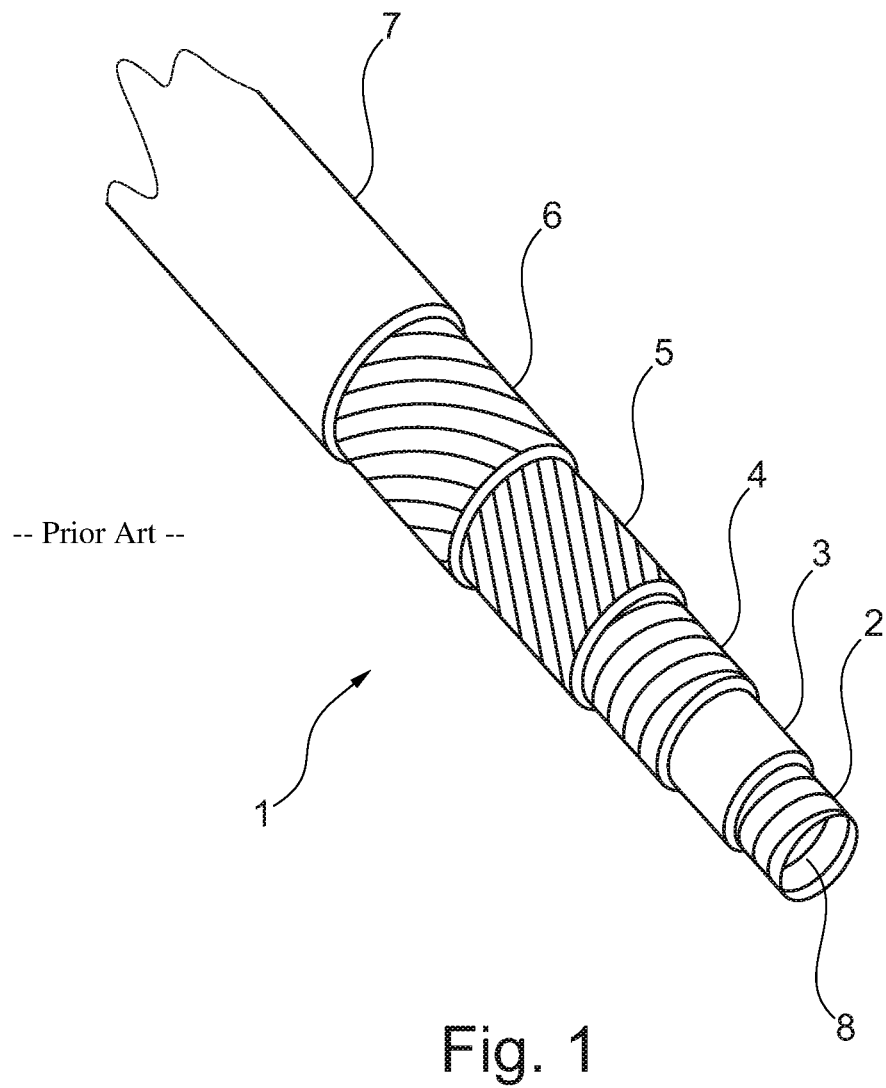
FIG. 1 shows an unbonded flexible pipe.

FIG. 1 shows an unbonded flexible pipe 1. The pipe 1 comprises from the inside and outwards a carcass 2 to support the internal pressure sheath 3. The internal pressure sheath 3 is surrounded by a pressure armour 4 and a first tensile armour 5 and a second tensile armour 6. The outermost part of the pipe 1 is the outer sheath 7. Between the internal pressure sheath 3 and the outer sheath 7 is formed an annulus in which the armour layers are located.

Figure 2:
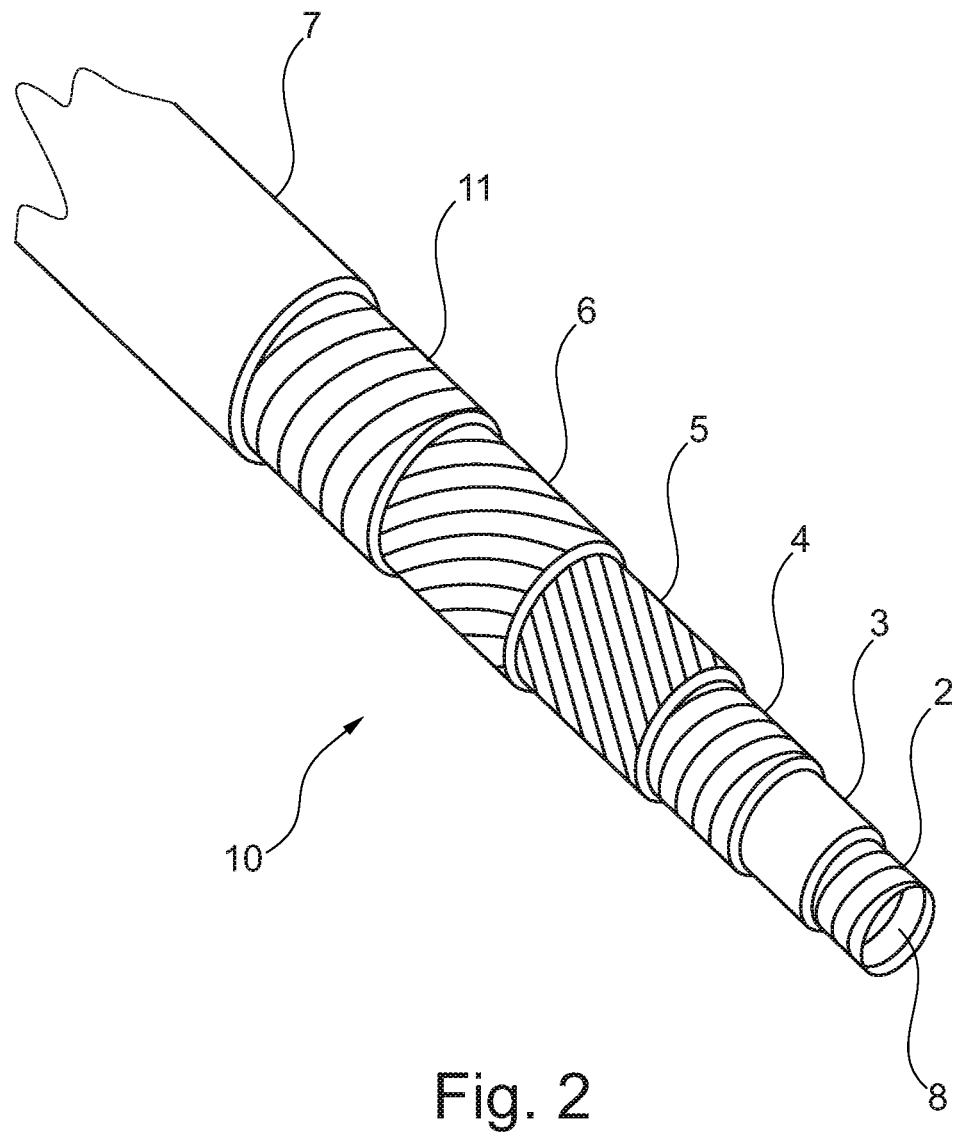
FIG. 2 shows a flexible pipe according to the invention.

FIG. 2 shows an unbonded flexible pipe 10 according to the invention. As the unbonded flexible pipe shown in FIG. 1 the pipe 10 comprises a carcass 2, internal pressure sheath 3, a pressure armour 4, a first tensile armour 5 and a second tensile armour 6 and an outer sheath 7. However, the pipe 10 further comprises a retaining layer 11 surrounding the second tensile armour 6 which is the outermost armour layer. The retaining layer 11 is surrounded by the outer sheath 7 which form a barrier for ingress of fluid such as sea water to the armour layers.

The carcass 2 is made from elongate strips of duplex steel with an "S-shaped" cross-section which allow adjacent windings to interlock. The strips are wound with a winding angle of 87° in respect of the axis of the pipe. The carcass 2 is placed in the bore 8 of the pipe and serves to protect the internal pressure sheath 3 against damage, e.g. in case of certain pressure drop.

The internal pressure sheath 3 is made from polyvinylidene fluoride which is extruded onto the outer surface of the carcass 2. The internal pressure sheath 3 forms the bore 8 in the pipe and provides a substantially fluid tight barrier between the bore and the armour layers on the outer side of the internal pressure sheath 3.

The pressure armour 4 placed on the outer surface of the internal pressure sheath 3 is wound from profiled strips of carbon steel. The winding angle is approximately 85° in respect of the axis. The pressure armour serves to protect the internal pressure sheath if the pressure suddenly increases.

The first and the second tensile armour 5, 6 protect the pipe toward axial stress. The tensile armour layers are made from elongate strips of carbon steel. The elongate strips are wound with a winding angle of approximately 55° in respect of the axis. In the particular embodiment the two layers are wound in opposite directions in respect of the axis.

The pipe 10 shown in FIG. 2 comprises a retaining layer 11 according to the invention. The retaining layer 11 is made from an elongate strip of carbon steel. The strip is wound around the outer tensile layer 6 with a winding angle of approximately 82° in respect of the axis. The retaining layer 11 serves to reduce radial displacement of the tensile armour layers 5, 6.

The outermost layer of the pipe 10 is the outer sheath 7 which is made from polyethylene and extruded onto the retaining layer 11. The outer sheath 7 provides a substantially fluid tight barrier between the environment and the metallic layers in the pipe.

Figure 3:
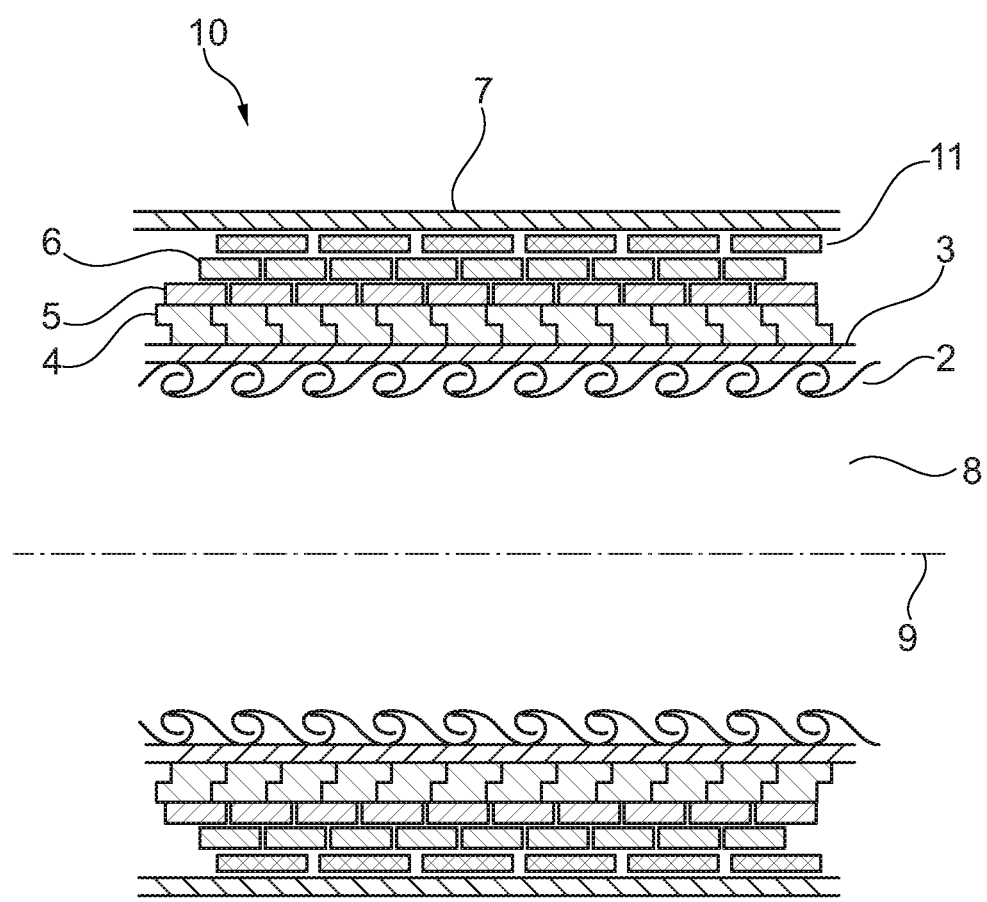
FIG. 3 shows a section of a flexible pipe according to the invention.

FIG. 3 shows a section of the pipe 10 according to the invention and depicted in FIG. 2. The pipe 10 comprises from the inside and out a carcass 2, made from duplex steel and having an "S-shaped" cross section which makes it possible for adjacent windings to interlock.

Outside and surrounding the carcass 2 is the internal pressure sheath 3, which forms the bore 8. The internal pressure sheath is made from polymer material and extruded onto the carcass 2.

Around the outer surface of the internal pressure sheath 3, the elongate profiled metal strip forming the pressure armour 4 is wound. The tensile armour layers 5 and 6 are wound around the pressure armour 3 and the outer tensile armour layer 6 is surrounded by the retaining layer 11 formed by an elongate metal strip.

Finally the pipe 10 comprises the outer sheath 7 of polymer material.

In FIG. 3 the centre axis of the pipe 10 is indicated by a dotted line 9.

Figure 4:
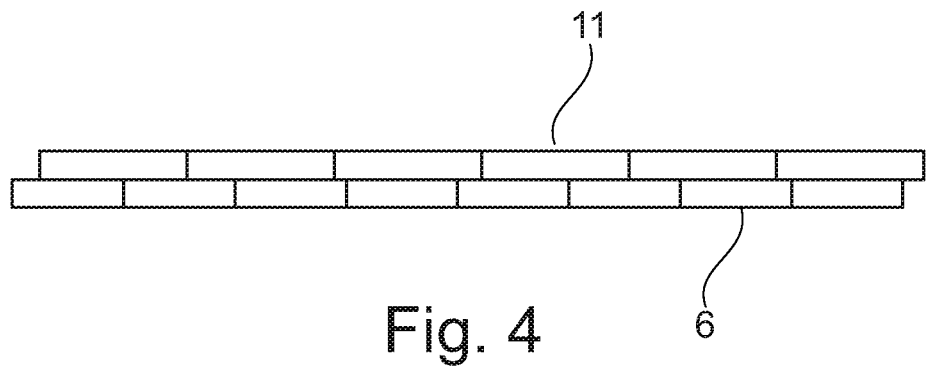
FIG. 4 shows an embodiment of a retaining layer according to the invention.

FIG. 4 shows an embodiment of a retaining layer 11 according to the invention. In this particular embodiment the retaining layer 11 are wound around the tensile armour layer 6 with tight adjacent windings without gaps.

Figure 5:
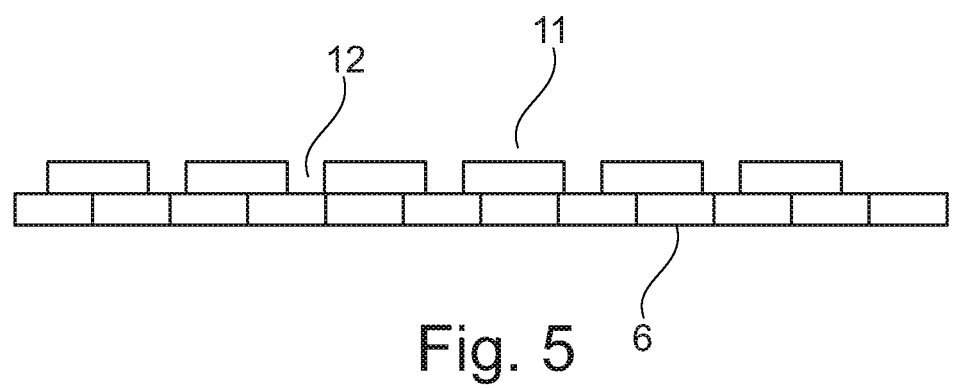
FIG. 5 shows an embodiment of a retaining layer according to the invention.

FIG. 5 shows an embodiment in which the retaining layer 11 is wound around the tensile armour 6 with gaps 12 between adjacent windings.

Figure 6:
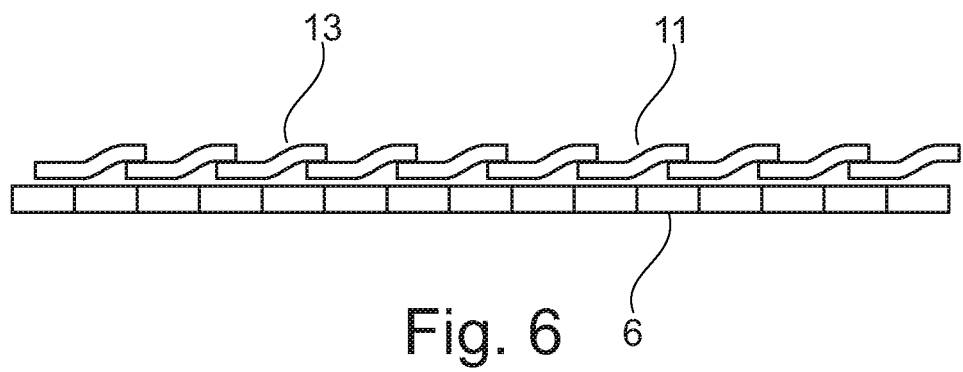
FIG. 6 shows an embodiment of a retaining layer according to the invention.

FIG. 6 shows an embodiment in which the windings of the retaining layer 11 have overlap zones 13.

Figure 7:
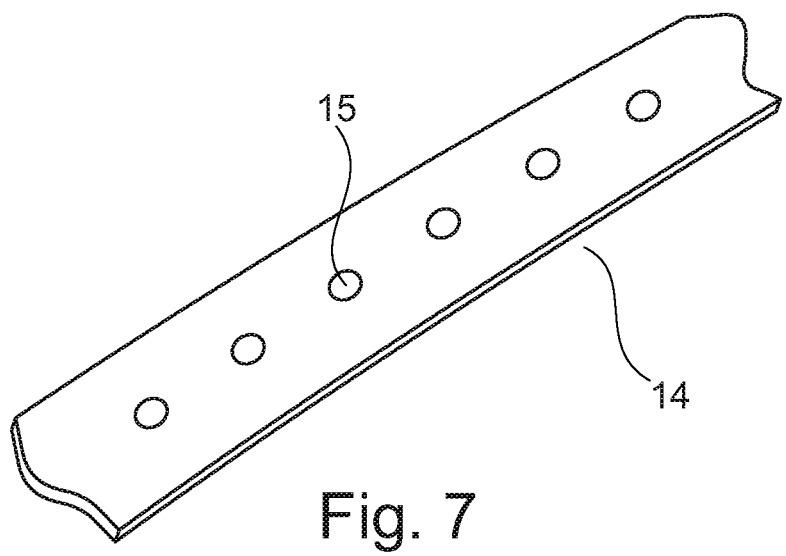
FIG. 7 shows a retaining layer comprising holes.

FIG. 7 shows a part of an elongate metallic strip 14, which metallic strip 14 may be wound up to form the retaining layer. The elongate metallic strip 14 comprises holes 15 which are spaced apart from each other with the same mutual distance along the length of the elongate metal strip 14. The holes may e.g. serve to reduce the risk of formation of gas pockets in the flexible pipe.

Figure 8:
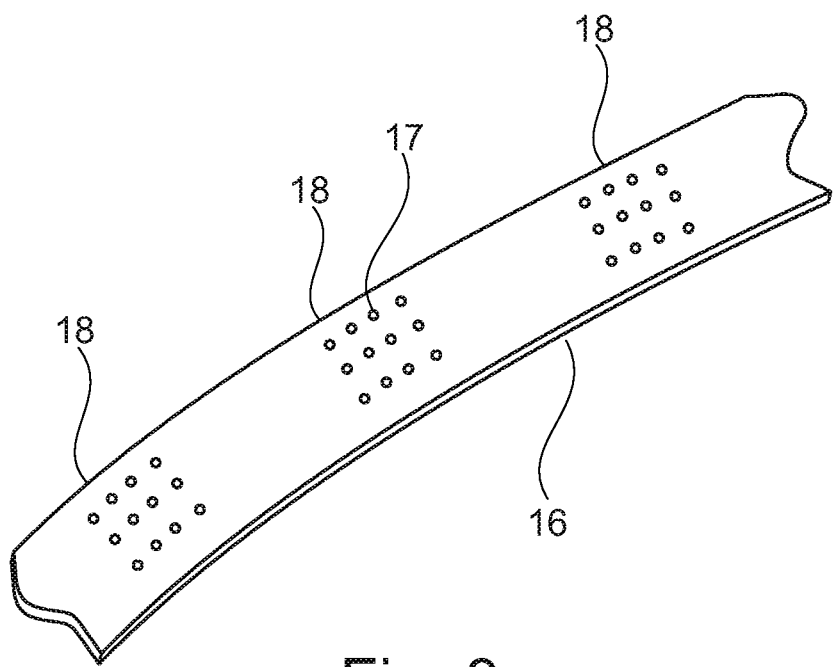
FIG. 8 shows a retaining layer comprising perforations.

FIG. 8 also shows a part of an elongate metallic strip 16, which may be wound up to form the retaining layer. This elongate metallic strip 16 comprises perforations 17 which are distributed in discrete areas 18 along the length of the elongate metallic strip 16. The perforations 17 may also serve to reduce the risk of formation of gas pockets in the flexible pipe.

Figure 9:
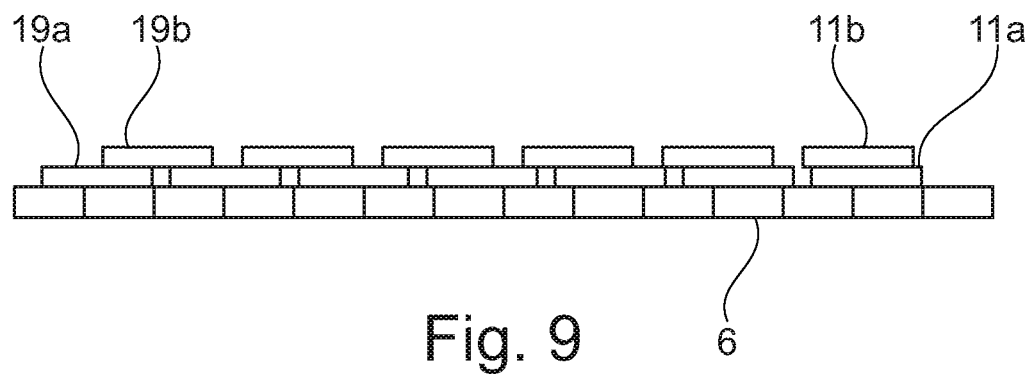
FIG. 9 shows a retaining layer.

FIG. 9 shows an embodiment in which a first retaining layer 11a constituted by an elongate metallic strip is wound around the tensile armour layer 6 and a second retaining layer 11b constituted by a metal strip 19b is wound around the first retaining layer 11a.

Figure 10:
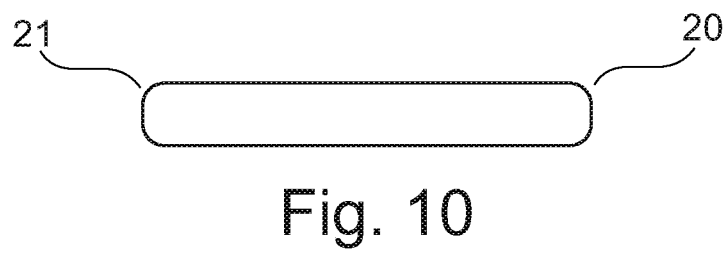
FIG. 10 shows a cross section of an elongate strip for a retaining layer.

FIG. 10 shows a cross section of an elongate metallic strip 20 for a retaining layer. In this embodiment the metallic strip has rounded edges 21 which reduces the risk of damage on the outer sheath.

Figure 11:
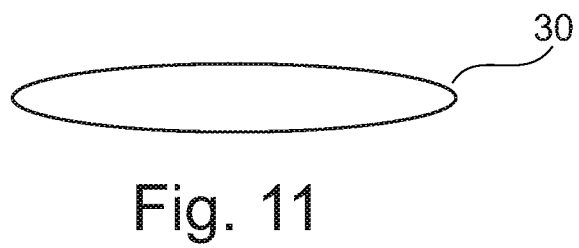
FIG. 11 shows a cross section of an elongate strip for a retaining layer.

FIG. 11 shows a cross section of an elongate metallic strip 30 for a retaining layer, which has an oval cross section. Such a cross section may also reduce the risk of damage to the outer sheath and also make it easier to wind the elongate metallic strip 30 with windings with overlap to form the retaining layer.

Figure 12:
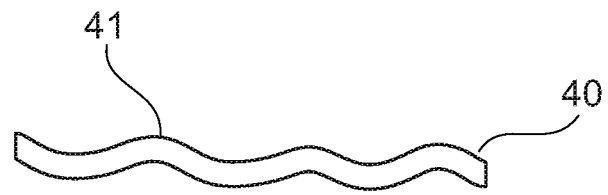
FIG. 12 shows a cross section of an elongate strip for a retaining layer.

FIG. 12 shows a cross section of an elongate metallic strip 20 for a retaining layer having an undulated cross section. The undulations may reduce optional axial displacement between the retaining layer and the outer sheath.

What is claimed is:

1. A flexible armoured pipe having a centre axis and comprising an internal pressure sheath and an outer sheath, the radial distance between said internal pressure sheath and said outer sheath defining an annulus, said annulus comprising at least one tensile armour layer surrounded by at least one retaining layer constituted by an elongate metallic strip wound around the at least one tensile armour layer with winding angle of at least 65° in respect of the centre axis, wherein the elongate metallic strip is non-interlocked and has a bending stiffness lower than $\frac{1}{10}$ of a bending stiffness of a wire forming the at least one tensile armour layer.

2. A flexible armoured pipe according to claim 1, wherein the elongate metallic strip has a width/thickness ratio in the range of 2 to 300.

3. A flexible armoured pipe according to claim 1, wherein the elongate metallic strip has a width in the range of 20 to 150 mm.

4. A flexible armoured pipe according to claim 1, wherein the elongate metallic strip has a thickness in range of 0.5 to 10 mm.

5. A flexible armoured pipe according to claim 1, wherein the elongate metallic strip has a thickness which is up to $\frac{1}{2}$ of the thickness of the wire forming the at least one tensile armour layer.

6. A flexible armoured pipe according to claim 1, wherein the elongate metallic strip is wound with a winding angle in respect of the centre axis in the range of 70° to 85°.

7. A flexible armoured pipe according to claim 1, wherein the elongate metallic strip is wound with a gap between adjacent windings, said gap being in the range of 1 mm to 350 mm.

8. A flexible armoured pipe according to claim 1, wherein the elongate metallic strip is wound with an overlap zone between adjacent windings, said overlap zone having a zone width in the range of 1 mm to 100 mm.

9. A flexible armoured pipe according to claim 1, wherein the elongate metallic strip is provided with a surface which is rougher in the overlap zone than in the remaining surface.

10. A flexible armoured pipe according to claim 1, wherein the elongate metallic strip has a tensile strength of 250 MPa or more when measured according to ASTM E8/E8M-13 (2013).

11. A flexible armoured pipe according to claim 1, wherein the elongate metallic strip has rounded edges.

12. A flexible armoured pipe according to claim 1, wherein the elongate metallic strip has a substantially rectangular cross section.

13. A flexible armoured pipe according to claim 1, wherein the elongate metallic strip has an undulated cross section.

14. A flexible armoured pipe according to claim 1, wherein the at least one tensile armour is wound from an elongate member with a winding angle in respect of the centre axis in the range of 10° to 50°.

15. A flexible armoured pipe according to claim 1, wherein the annulus comprises a pressure armour and wherein the elongate metallic strip has a bending stiffness lower than $\frac{1}{10}$ of a bending stiffness of a wire forming the pressure armour.

16. A flexible armoured pipe according to claim 1, wherein the annulus comprises a pressure armour, which is wound from an elongate member with a winding angle in respect of the centre axis in the range of 75° to 90°.

17. A flexible armoured pipe having a centre axis and comprising an internal pressure sheath and an outer sheath, the radial distance between said internal pressure sheath and said outer sheath defining an annulus, said annulus comprising at least one tensile armour layer surrounded by at least one retaining layer, wherein the at least one retaining layer comprises two or more elongate metallic strips, said two or more elongate metallic strips being wound around the at least one tensile armour layer with a winding angle of at least 65° in respect of the centre axis and in a parallel track with the same winding directions in respect of the centre axis, and wherein the two or more elongate metallic strips each have a bending stiffness lower than $\frac{1}{10}$ of a bending stiffness of a wire forming the at least one tensile armour layer.

18. A flexible armoured pipe having a centre axis and comprising an internal pressure sheath and an outer sheath, the radial distance between said internal pressure sheath and said outer sheath defining an annulus, said annulus comprising at least one tensile armour layer surrounded by at least two retaining layers constituted by elongate metallic strips, said elongate metallic strips of the at least two retaining layers being wound with different winding angles in respect of the centre axis, wherein the elongate metallic strips each have a bending stiffness lower than $\frac{1}{10}$ of a bending stiffness of a wire forming the at least one tensile armour layer.

* * * * *

UNITED STATES PATENT AND TRADEMARK OFFICE
CERTIFICATE OF CORRECTION

PATENT NO. : 11,162,618 B2
APPLICATION NO. : 16/315247
DATED : November 2, 2021
INVENTOR(S) : Karl-Johan Lolk Westhoff et al.

It is certified that error appears in the above-identified patent and that said Letters Patent is hereby corrected as shown below:

In the Specification

Column 9, Line 16, "winding angle of at least" should read -- a winding angle of at least --.

Signed and Sealed this
Thirty-first Day of May, 2022

Katherine Kelly Vidal
Director of the United States Patent and Trademark Office